United States Patent
Clune

Patent Number: 6,162,040
Date of Patent: Dec. 19, 2000

[54] MOLDS FOR FORMING TOUCH FASTENERS

[75] Inventor: William Clune, Concord, N.H.

[73] Assignee: Velcro Industries B.V., Netherlands Antilles

[21] Appl. No.: 09/241,509

[22] Filed: Feb. 1, 1999

[51] Int. Cl.[7] ................................................. B29C 43/46
[52] U.S. Cl. .......................... 425/363; 264/167; 425/471; 425/814
[58] Field of Search ..................................... 425/363, 470, 425/471, 814, 194; 264/167, 173.1, 175, 318, 334

[56] References Cited

U.S. PATENT DOCUMENTS

| | | |
|---|---|---|
| 700,606 | 5/1902 | Barnes . |
| 2,499,898 | 3/1950 | Anderson . |
| 3,266,113 | 8/1966 | Flanagan, Jr. . |
| 3,312,583 | 4/1967 | Rochlis . |
| 3,507,010 | 2/1970 | Doleman et al. . |
| 3,752,619 | 8/1973 | Menzin et al. . |
| 3,808,648 | 5/1974 | Billerant et al. . |
| 3,900,652 | 8/1975 | Uraya et al. . |
| 3,987,144 | 10/1976 | Nickold . |
| 4,169,303 | 10/1979 | Lemelson . |
| 4,454,183 | 6/1984 | Wollman . |
| 4,725,221 | 2/1988 | Blanz ..................................... 425/814 |
| 4,775,310 | 10/1988 | Fischer ................................... 425/814 |
| 4,794,028 | 12/1988 | Fischer . |
| 4,846,815 | 7/1989 | Scripps . |
| 4,946,527 | 8/1990 | Battrell . |
| 5,067,210 | 11/1991 | Kayaki . |
| 5,077,870 | 1/1992 | Melbye et al. . |
| 5,201,101 | 4/1993 | Rouser et al. . |
| 5,212,853 | 5/1993 | Kaneko . |
| 5,212,855 | 5/1993 | McGanty . |
| 5,221,276 | 6/1993 | Battrell . |
| 5,242,646 | 9/1993 | Torigoe et al. . |
| 5,312,456 | 5/1994 | Reed et al. . |
| 5,315,740 | 5/1994 | Provost . |
| 5,345,659 | 9/1994 | Allan . |
| 5,396,687 | 3/1995 | Osterman . |
| 5,671,512 | 9/1997 | Hattori et al. . |
| 5,713,111 | 2/1998 | Hattori et al. . |
| 5,781,969 | 7/1998 | Akeno et al. . |

FOREIGN PATENT DOCUMENTS

| | | |
|---|---|---|
| 0 714 614 A1 | 6/1996 | European Pat. Off. . |
| 0 793 923 A1 | 9/1997 | European Pat. Off. . |
| 36 20 791 C2 | 12/1987 | Germany . |
| 2 279 106 | 12/1994 | United Kingdom . |
| WO 94/23610 | 10/1994 | WIPO . |

*Primary Examiner*—James P. Mackey
*Attorney, Agent, or Firm*—Fish & Richardson P.C.

[57] ABSTRACT

A method is provided for forming an array of fastener elements extending from a common base. The method includes delivering moldable resin to a mold having a mold surface from which a plurality of fixed mold cavities extend inwardly, each mold cavity having a throat extending from the mold surface and a bowl extending from the throat to a bowl rim, a protrusion of the mold extending into the bowl, thereby filling the mold cavities and forming the common base; solidifying the resin in the cavities to form the fastener elements; and removing the solidified fastener elements from their corresponding fixed mold cavities by pulling the common base away from the mold surface.

12 Claims, 7 Drawing Sheets

MOLDS FOR FORMING TOUCH FASTENERS

BACKGROUND OF THE INVENTION

The invention generally relates to touch fastener products and to methods of their manufacture.

Hook components for hook and loop fastening include a base from which an array of tiny fastener elements, e.g., hook-shaped or mushroom shaped elements, extend. Hook components with hook-shaped elements may be formed by integrally molding the base and fastener elements in a continuous process employing a mold roll that includes a set of stacked disk-shaped mold plates having fastener-shaped cavities defined at their peripheries, e.g., as described in U.S. Pat. No. 4,794,028 (Fischer), the full disclosure of which is incorporated herein by reference. Hook components may also be injection molded as discrete parts.

To form a closure, male fastener elements engage overlying female fastener elements. Certain fastener products have arrays of male fastener elements that are designed to interlock upon closure. Such products are called self-engaging.

When the male element is hook-shaped, the fastener will exhibit directional shear strength, i.e., the shear strength in one direction will be significantly higher than in other directions. In some applications it is desirable that the fastener exhibit non-directional shear strength, i.e., shear strength substantially equal in all directions. To accomplish this, some fasteners have "mushroom" shaped male elements (i.e., heads that overhang the stem on all sides), which provide a uniform shear strength in all directions.

While mushroom shaped male elements provide desirable strength properties, they are difficult to form complete with closed-cavity molding processes, such as described by Fischer, because the head is larger than the stem and would tend to be torn from the stem when the element is pulled from its mold cavity.

Other methods of forming mushroom-shaped fastening elements have included melting distal ends of polymer filaments woven into a backing, or otherwise forming heads on previously formed stems.

SUMMARY OF THE INVENTION

The present invention features a useful method for forming mushroom-shaped fastener elements in closed mold cavities.

In one aspect, the invention features a method for forming an array of fastener elements extending from a common base. The method includes (a) delivering moldable resin to a mold having a mold surface from which a plurality of fixed mold cavities extend inwardly, each mold cavity having a throat extending from the mold surface and a bowl extending from the throat to a bowl rim, a protrusion of the mold extending into the bowl, thereby filling the mold cavities and forming the common base, (b) solidifying the resin in the cavities to form the fastener elements, and (c) removing the solidified fastener elements from their corresponding fixed mold cavities by pulling the common base away from the mold surface.

Preferred methods include one or more of the following features. The cross-sectional area of each mold cavity, measured perpendicular to a resin flow path along the cavity, increases monotonically from the bowl rim to the substrate surface. The mold cavities are formed by aligning a plurality of mold plates in face to face relation, and registered openings in the aligned mold plates define the mold cavities. The mold plates are disk-shaped and, when aligned, form a mold roll, the mold cavities extending inwardly from the peripheral surface of the mold roll. The delivering step comprises extruding molten resin into a nip defined by the mold roll and a pressure roll. The mold plates include outer plates on either side of a central plate and the central plate having the protrusion. The method also includes, after removing the fastener elements from the cavities, deforming distal regions of the fastener elements to form multiple petals of resin projecting laterally from a common rim to overhang the base and define loop-engageable recesses. Each of the fastener elements includes a stem formed in the throat portion of the molding cavity, and each stem is permanently elongated during the removing step.

In another aspect, the invention features a fastener device comprising a common base and an array of fastener elements integrally molded with and extending from the common base. Each fastener element includes (a) a solid stem portion adjacent the common base, the solid portion extending from the common base to a distal end, (b) a hollow portion molded at the distal end of the solid stem portion, the hollow portion defining a cavity extending into the distal end of the hollow portion from an exposed distal rim, and (c) multiple petals of molded resin projecting laterally from the distal rim to overhang the common base and define loop-engageable recesses.

In preferred embodiments, the petals extend toward the common base.

In yet another aspect, the invention again features a fastener device comprising a common base and an array of fastener elements molded with and extending from the common base. In this embodiment, each fastener element includes (a) a solid stem portion adjacent the common base, the solid portion extending from the common base to a distal end, and (b) a head portion molded at the distal end of the solid portion and having a cavity extending into the head portion from a continuous, exposed distal rim. The cross-sectional area of each fastener element, measured perpendicular to a resin flow path along the fastener element from the base to the exposed rim, increases monotonically from the distal rim to the common base.

The invention also features molds for forming fastener elements.

By "increasing monotonically", we mean that the flow area of the element, i.e., the cross-sectional area parallel to the resin flow path, does not locally decrease as one moves along the flow path from rim to base.

Other features and advantages of the invention will be apparent from the following description of a presently preferred embodiment, the drawings, and from the claims.

BRIEF DESCRIPTION OF THE DRAWINGS

FIG. 2A is a graph showing the change in flow area along line F as a function of the distance from the base of the fastener element.

DESCRIPTION OF EMBODIMENTS

Figure 1:
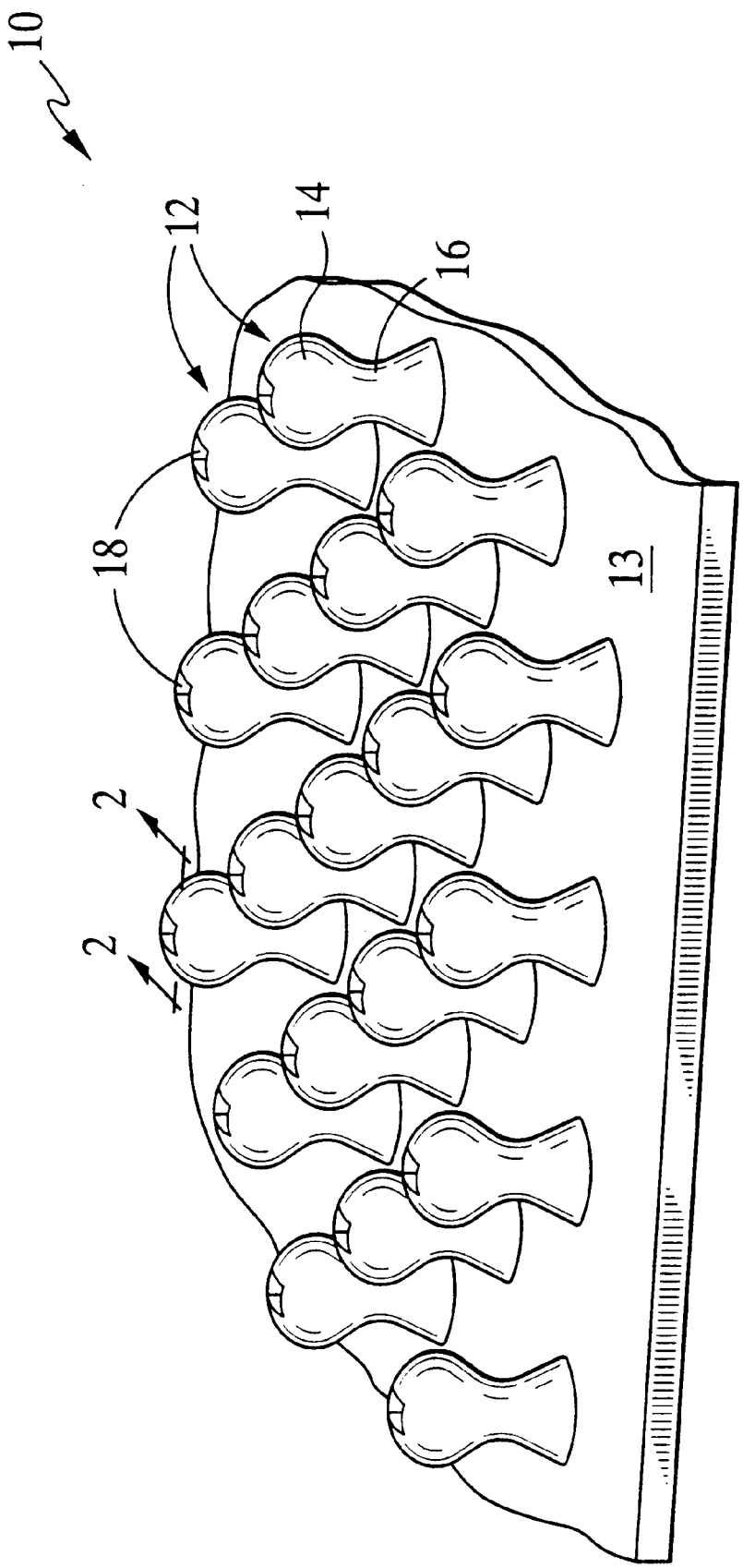
FIG. 1 is a perspective view of an array of fastener elements extending from a common base.

FIG. 1 shows an array 10 of bulbous fastener elements 12 extending from a common sheet-form base 13. As will be readily understood by the artisan, if these fastener elements were entirely solid, it would typically be impossible to mold them in a closed (i.e., non-opening) mold cavity because the bulbous heads 14 could not be pulled through the narrower portion of the mold cavity used to mold stems 16.

According to the invention, however, heads 14 include a hollow portion which collapses when the molded fastener element is stripped complete from its closed mold cavity, as will be discussed further below. Thus, fastener elements overhanging the base on all sides about their stems are stripped from closed cavities without significant permanent damage to the fastener elements and without leaving portions of the molded fastener elements in their cavities upon removal. The peripheral overhang of each fastener element, in combination with the patterned arrangement of the fastener elements around the base and the presence of the hollow portions, allows the fastener elements to be self-engaging with another array of similar fastener elements. When the two arrays are pressed together, the heads 14 of the opposing fastener elements initially contact each other and then collapse as they are forced between each other. After they pass each other, the opposed heads re-expand, and are trapped in engagement. A similar collapse and re-expansion process occurs upon the disengagement of the arrays of fastener elements.

Figure 3:
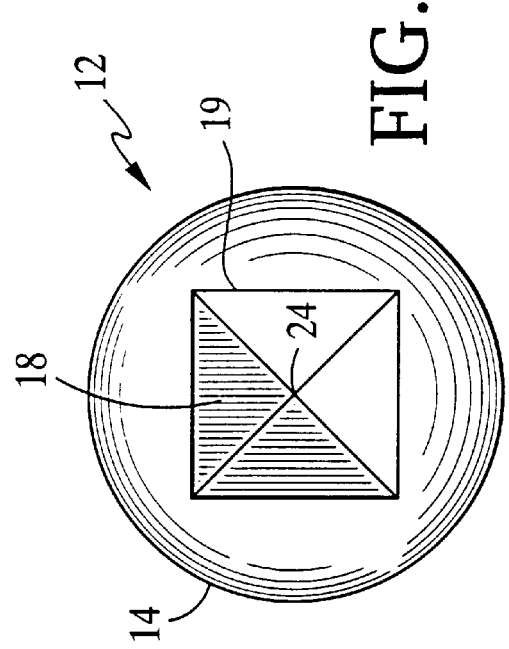
FIG. 3 is a top view of one of the fastener elements shown in FIG. 1.
Figure 2:
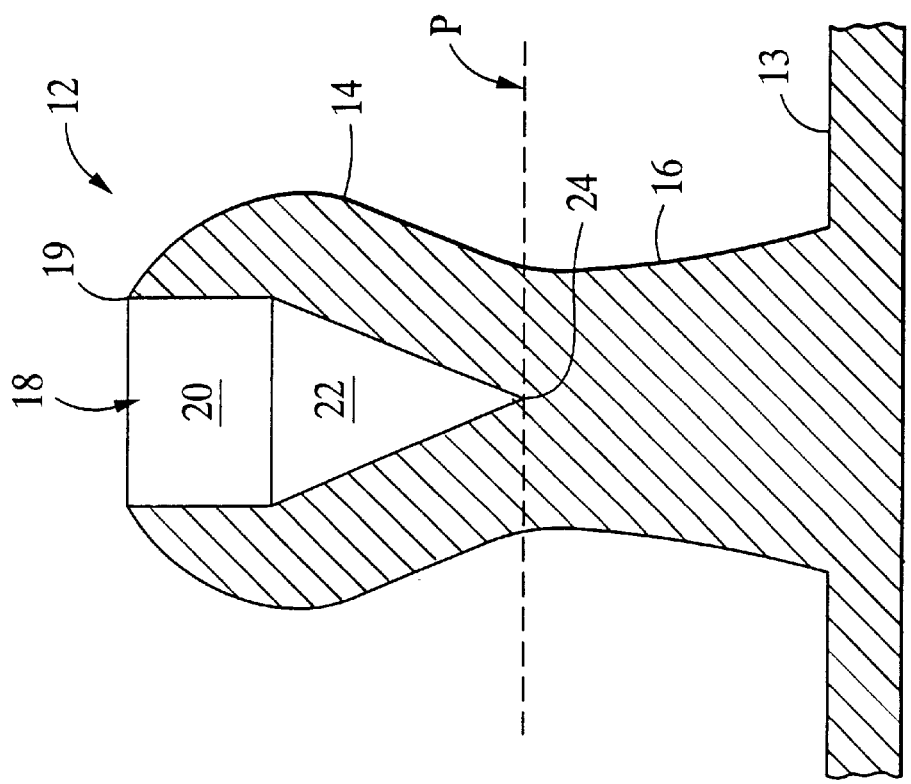
FIG. 2 is a cross-sectional view of one of the fastener elements, taken along line 2—2 in FIG. 1.

Referring now to FIGS. 2 and 3, the head 14 of each fastener element 12 is generally circular as viewed from the top, with a prismatic cavity 18 defined in its center. Cavity 18 has a rim 19, and consists of a square parallelepiped portion 20 and a contiguous, inverted pyramid portion 22, the bottom side of the parallelepiped portion defining the base of the pyramid portion. Head 14 is integrally molded at the distal end of a solid stem 16, which extends from common base 13 to plane P, the plane parallel to common base 13 and containing apex 24 of pyramid portion 22. Preferably, the walls of the parallelepiped portion 20 extend essentially perpendicularly to the extent of the base, permitting the cross-sectional area of the distal portion of the head to increase substantially as the outer surfaces of the upper portion of the head slant outward, moving downward from rim 19. The prismatic nature of the cavity 18 allows it to be formed with a combination of flat mold surfaces, which can be significantly less expensive to form, using conventional mold-making techniques, than convex surfaces. Stem 16 narrows continuously from base 13 to plane P, with cross-sections of the trunk taken in planes parallel to plane P (i.e., "horizontal" planes) having similar shapes. Due to the continuous narrowing, the cross-sectional area of stem 16 in any given horizontal cross-section is less than the cross-sectional area of the trunk in any horizontal plane that is closer to common base 13. Fastener elements 12 have a height, from the common base 13 to the top of the fastener element, of about 0.02 inch to 0.15 inch, although smaller elements may be desirable in some applications. The apex 24 of the inverted pyramid portion 22 is located at about one half the height of the fastener element. Base 13 has a thickness of preferably between about 0.005 inch and 0.030 inch. Stem 16 has a diameter at its base of between about 0.025 and 0.045 inch, and tapers in width between base 13 and the head 14, such that stem 16 has a diameter at its narrowest region (at plane P), of about 0.005 to 0.010 inches less than at its base. Pyramid portion 22 preferably defines an angle of about 50 to 70 degrees. Square portion 20 has a width and length of about 0.05 to 0.08 inch and a height of about 0.03 to 0.05 inch.

Figure 5:
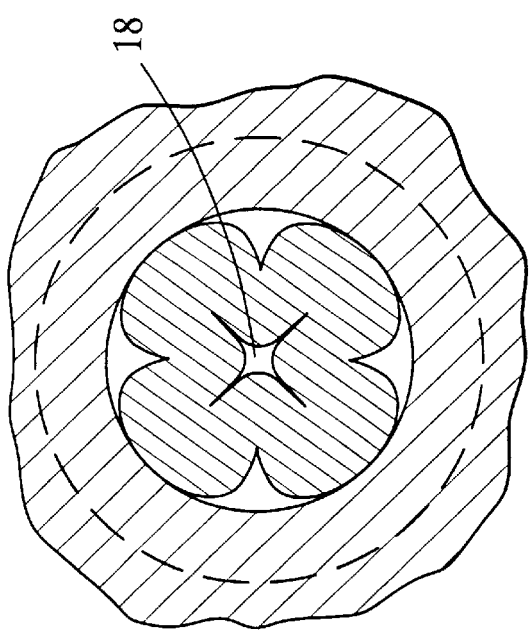
FIG. 5 illustrates the collapsed condition of the fastener element head during release from the mold, in a top cross-sectional view at an elevation corresponding to line 5—5 in FIG. 4.
Figure 4:
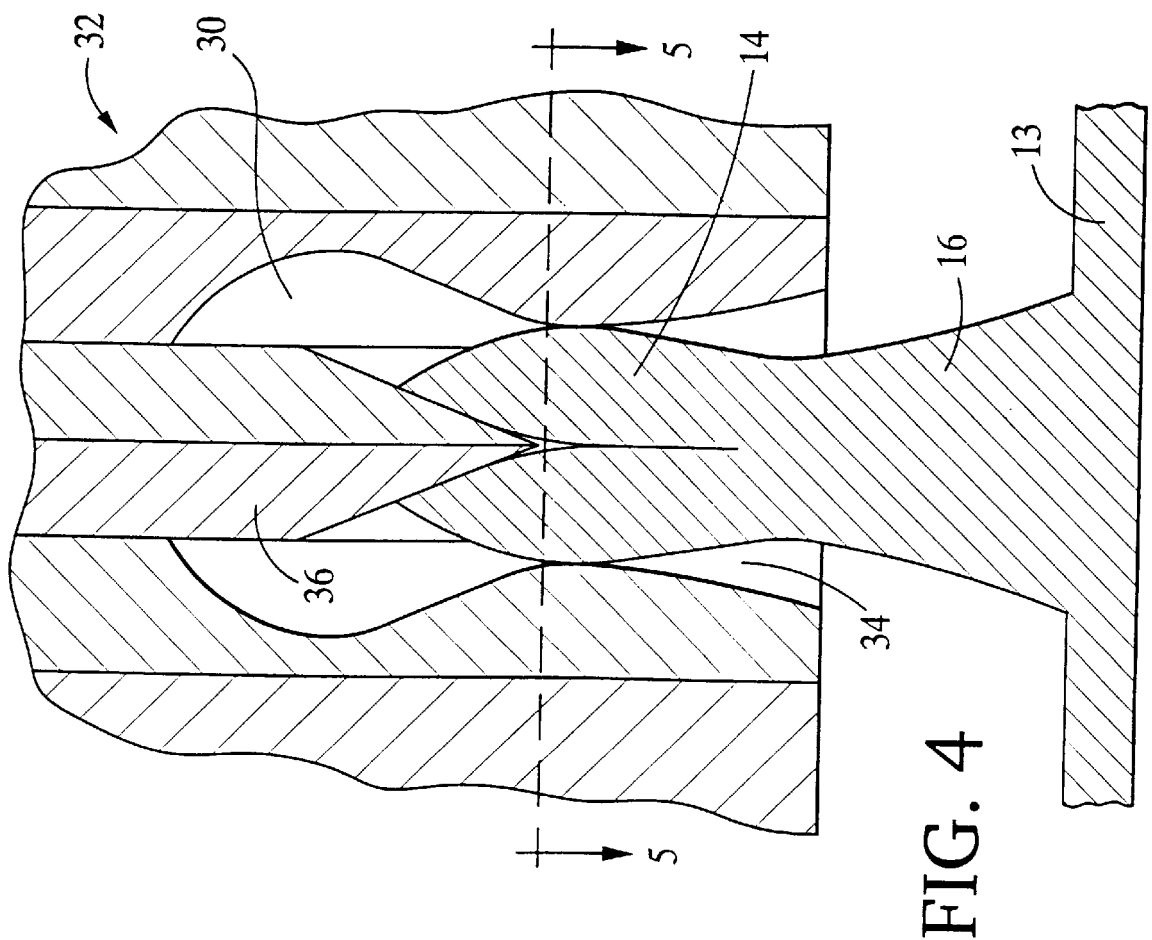
FIG. 4 illustrates the collapsed condition of the fastener element head during release from the mold, in side cross-sectional view.

Referring to FIG. 4, the geometry of fastener element 12 is such that the molded fastener element may be pulled from its mold cavity 30 in mold 32 without opening or otherwise altering the geometry of the mold cavity. Stem 16 readily releases from the walls of the stem-forming portion 34 of the cavity, due to the continuous narrowing of the stem. The extraction of head 14, however, requires the head to temporarily deform, as shown in FIGS. 4 and 5, to pass downward through the stem-forming portion of the mold cavity. It is important that the geometry of the head allow the head to readily deform so as to avoid detaching the molded head from the trunk during extraction, and leaving portions of the head in the cavity. This deformation is enabled by cavity 18 in head 14, discussed above. Cavity 18 is molded into head 14 by mold protrusion 36, which extends outwardly into the mold cavity 30.

Referring back to FIGS. 2 and 2A, one of the features of the geometry of the fastener element 12 that enables the molded fastener element to be safely pulled from its mold cavity without changing the geometry of the cavity is that the cross-sectional area of the mold cavity, measured perpendicular to the path F along which the molded resin travels as the fastener element is demolded, increases monotonically from rim 19 to base 13. Above plane R, such increase is apparent from considering a section along $S_1$, taken perpendicular to F. $S_1$ would cut through head 14 along a frustroconical surface were cavity 20 cylindrical rather than prismatic. It is clear that the area of the section along $S_1$ is slightly greater than the area along a similar section just above $S_1$, and slightly less than the area of a similar section just below $S_1$, due in part to the sharp increase in head thickness moving from rim 19 to plane R. (Head 14 obtains its maximum diameter at plane R.) Between planes R and P, the gradual increase in area is not as readily apparent at first glance. The effect of the change in area about a section $S_2$ due to the decrease in head diameter moving toward the base is to decrease the flow area of the cavity, but this effect is more than offset by the increase in area due to the diminishing area of the pyrimidal inner cavity portion 22. Thus, there is an overall continuous increase in flow area moving from plane R to plane P, as shown in FIG. 2A. Below plane P, flow line F is straight and perpendicular and extends along the center axis of stem 16. As the diameter of stem 16 continuously increases toward base 13, so does the flow area below plane P.

Figure 7:
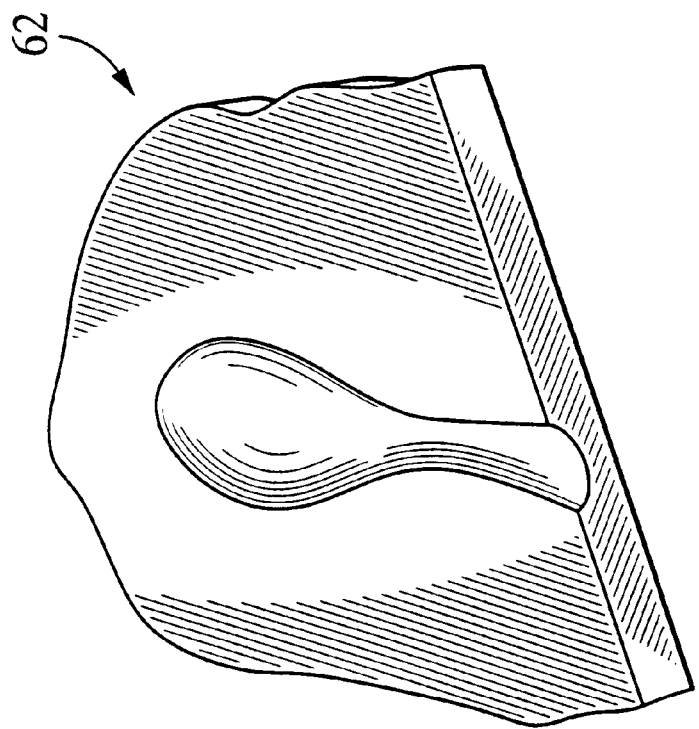
FIG. 7 is a partial perspective view of an outer mold plate for partially defining the mold cavity shown in FIG. 4.
Figure 6:
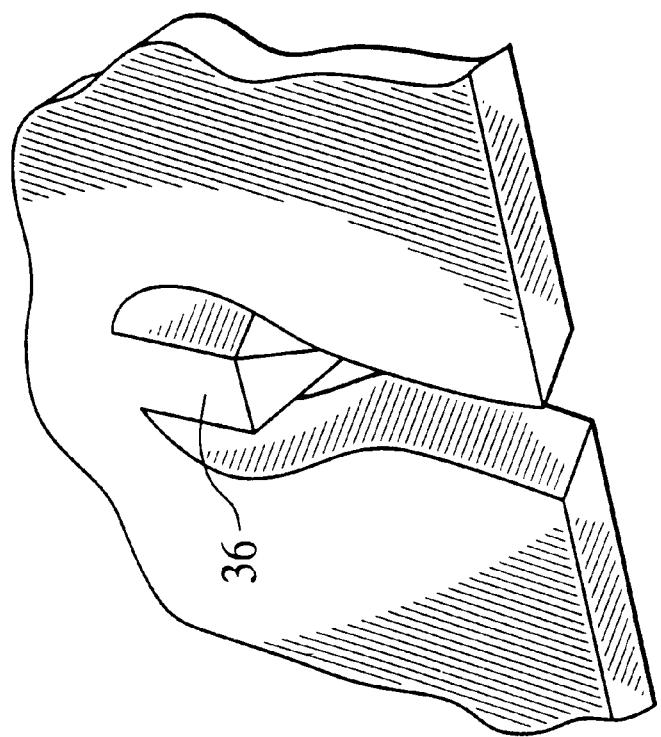
FIG. 6 is a partial perspective view of a central mold plate for partially defining the mold cavity shown in FIG. 4.

Continuous fastener tapes having the above-described fastener elements can be made, e.g., by a variation of the process disclosed in Fischer, U.S. Pat. No. 4,794,028. According to the Fischer process, a mold roll includes a set of stacked disk-shaped mold plates having fastener-shaped cavities defined at their peripheries. To form the mold cavity shown in FIG. 4, the stack of mold plates includes two central mold plates 60, one of which is shown in FIG. 6, that together form the protrusion 36, and two outer mold plates 62 having open regions defining the portions of the mold cavity surrounding the protrusion on two opposite sides (e.g., as shown in cross-section in FIG. 4). As shown in FIG. 7, the outer mold plates 62 have substantially "spoon-shaped" open areas. To form the fastener elements and base, molten resin is continuously extruded and applied with pressure against the cooled mold roll to force the resin into the mold cavities. The resin may be extruded into a nip between a rotating mold roll and a counter-rotating pressure roll, as shown in Fischer '028, or into the gap between the mold roll and a fixed extrusion head, to form a sheet-form base that is integral with the molded fastener elements. The formed resin is cooled while on the roll, after which the sheet-form base and integral fastener elements are stripped from the mold roll. The ability of the fastener elements to collapse and then be restored to their expanded, as-molded, condition results from a controlled cooling which imparts to the thermoplastic resin sufficient resilience and elasticity to allow the fastener elements to collapse and then spring back into their expanded form. The fastener elements should not be cooled so rapidly as to cause them to be too rigid. Excessive rigidity can cause the fastener elements to break as they are withdrawn from the mold.

Moldable resin may also be injected into mold cavities to form the fastener elements by injection molding, to either form the fastener elements directly on molded products, or with a base constructed to be attached to a separate product. For injection molding discrete products having arrays of such fastener elements, the mold plates may be stationary and form a flat, common edge from which the cavities extend. The fastener element cavities are thus continguous with a base-forming cavity.

The moldable resin may be any suitable plastic material depending on the intended fastener application. Currently, polypropylene is preferred. Nylon, polyesters, polyethylene, propylene, ethylene and copolymers thereof, as well as other thermoplastic and thermosetting resins are also suitable.

Figure 8:
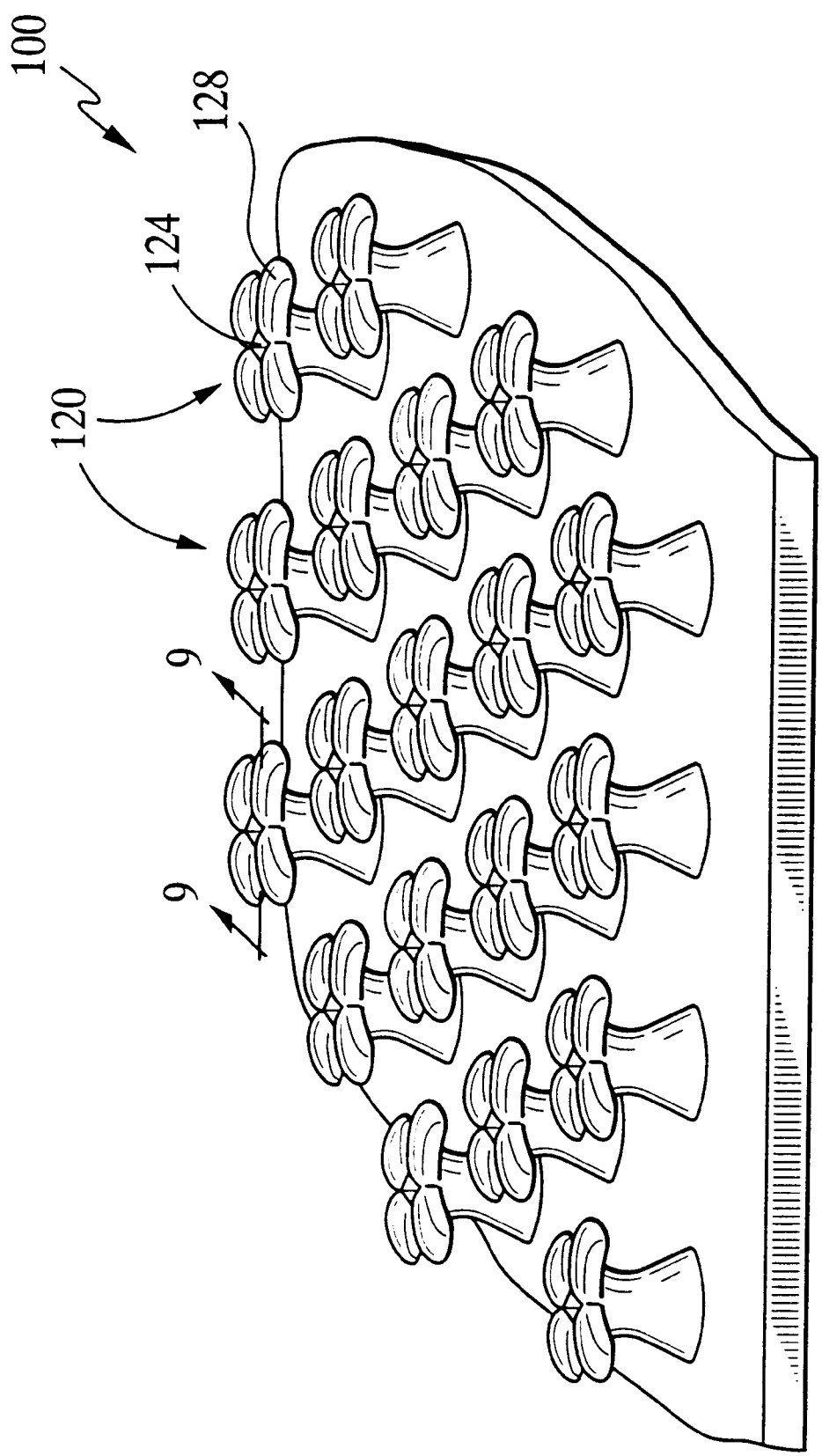
FIG. 8 is a perspective view of an array of a second type of fastener elements extending from a common base.

The fastener elements shown in FIG. 1 can be readily modified, after molding, to form fastener elements 120 having loop-engageable protrusions 124, as shown in FIG. 8.

Figure 9:
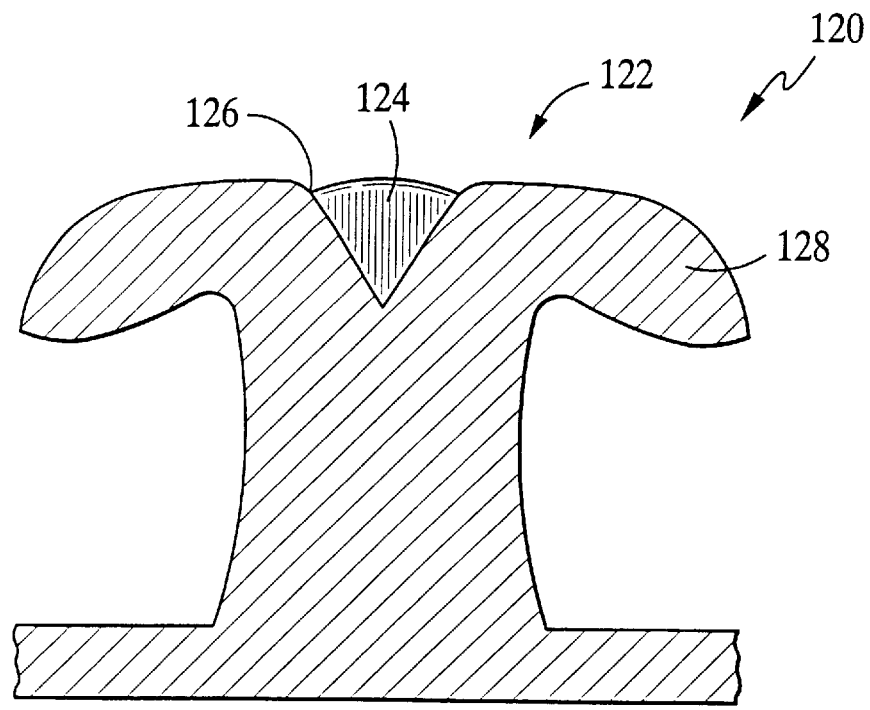
FIG. 9 is a side cross-sectional view of one of the fastener elements shown in FIG. 8, taken along line 9—9 in FIG. 8.
Figure 10:
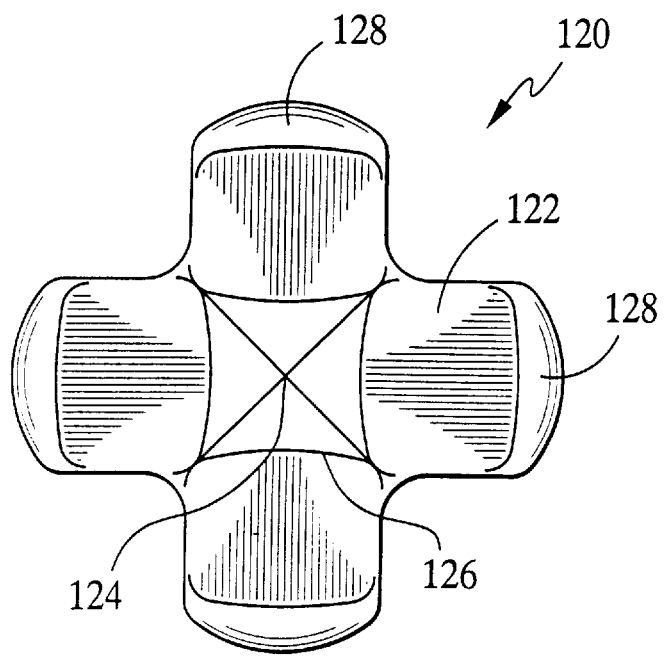
FIG. 10 is a top view of one of the fastener elements shown in FIG. 8.

Referring now to FIGS. 9 and 10, fastener element 120 has undergone a post-formation process to improve the ability of the fastener element to engage loop elements of a corresponding mating loop fastener. The fastener element 120 is formed by longitudinally splitting the head of the fastener element of FIGS. 2 and 3 at the corners of its inner cavity, forming four "petals" 128 which are splayed outwardly from a common rim 126 about a hollow center 124. Ideally, these petals project slightly downward toward the base, forming re-entrant crooks for capturing loops. Even without being re-entrant, however, the outward displacement of petals 128 can improve the ability of the fastener element to retain loops. To enhance the splitting of the head of the fastener element to form petals 128, the preform fastener element 14 (FIG. 1) may be formed with longitudinal grooves in its head adjacent the four corners of parallelepiped portion 20 of cavity 18, either on the inner surfaces or outer surfaces of the head of the fastener element. Such grooves can be formed, for instance, by providing corresponding ribs on either the inner surfaces of the spoon-shaped mold plates 62 (FIG. 7) or on the projections of the inner mold plates 60 (FIG. 6). These grooves will form splitting lines, at which the head of the molded fastener element preform 14 will tend to split as it is crushed, such as by a roller. As the fastener element is so crushed, the head is rent to form petals 128 and a flat surface 122 is formed at the top of the deformed head.

Other embodiments are within the claims. For example, the stems of the fastener elements can be purposefully elongated during removal from the mold cavity, formed with mold cavities having stem portions which are shorter than the stems of the molded fastener elements. Even though the heads are collapsible, the heads provide a certain amount of resistance to removal of the fastener element from the mold cavity. If an appropriate resin is selected and/or the cooling parameters are controlled accordingly, permanent stretching will occur in the stems. This elongation may be desirable if a thin, flexible stem is needed in a particular application, or if increased stem molecular orientation is desired.

Figure 11:
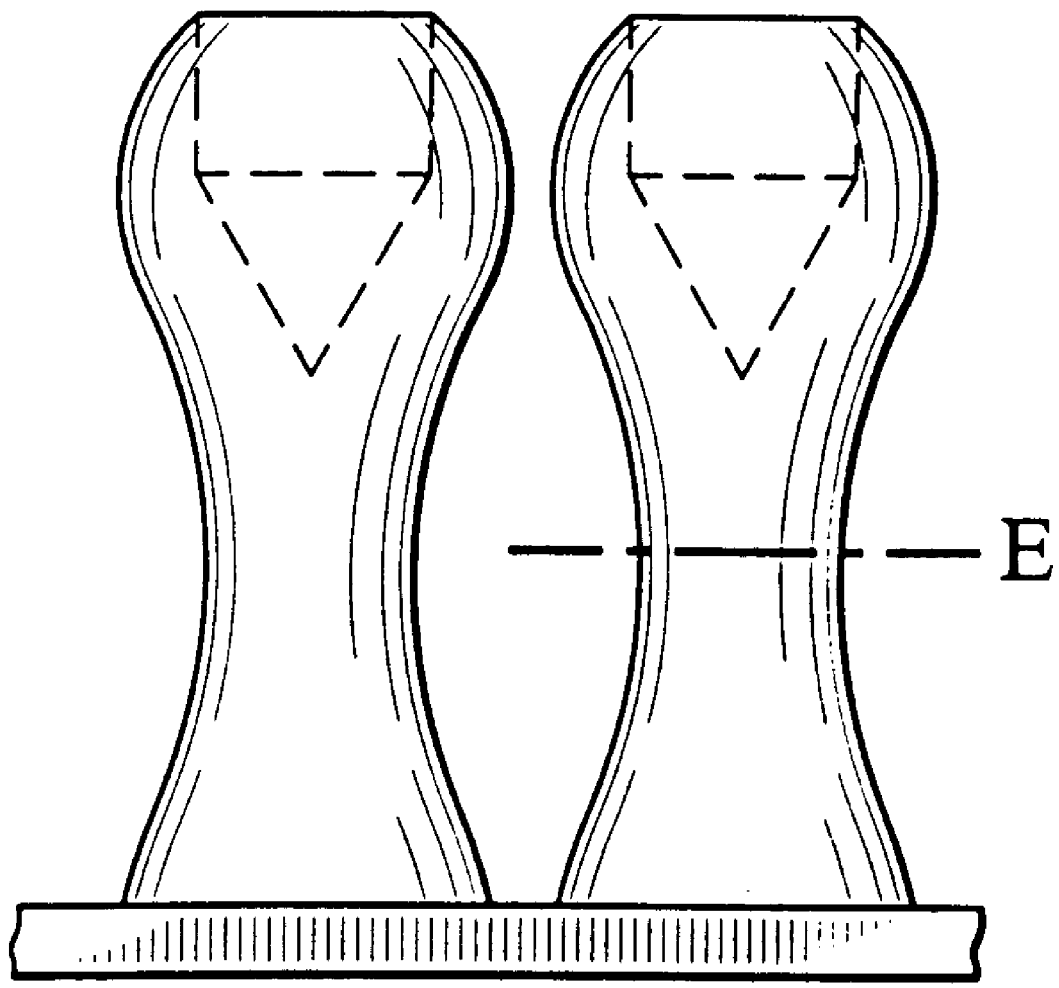
FIG. 11 is a side cross-sectional view of a molding cavity for forming fastener elements with stretching occuring during demolding.

A molding cavity configuration for slightly stretching the stems of the fastener elements as they are demolded is shown in FIG. 11, for example. As shown in FIG. 11, the elevation E of the narrowest region of the neck is below the tip of the inner cavity, so that the part of the stem between them will be forced to stretch as it is demolded. As this stretching occurs, the stem will narrow (according to Poisson's ratio) to fit through the throat of the stem. Thus, some deviation from monotonicity can be accomodated, provided the fastener elements are formed from a material that will stretch sufficiently during demolding.

Additionally, the cavity 18 in the head of the fastener element can have other geometries than that shown, provided the geometry allows the head of the fastener element to be demolded from a closed mold. For instance, the cavity may have other polyfaceted shapes than that shown, forming more or less than four corners about the rim of the fastener element head. Thus, more or less than four splitting points may be formed, for forming splayed fastener elements with more or less than the four petals shown.

What is claimed is:

1. A mold for forming a fastener device in the form of an array of fastener elements molded with and extending from a common base, the mold comprising a mold body having a surface for molding the common base and from which surface an array of mold cavities extend into the mold body for molding the fastener elements, each mold cavity comprising:

a throat portion adjacent said surface, the throat portion extending from said surface to a distal end for forming a stem of a fastener element molded in the mold cavity, and a head portion at the distal end of the throat portion for forming an overhanging head on a fastener element molded in the mold cavity, the mold having a protrusion extending into the head portion to form a hollow portion at the top of a fastener element molded in the mold cavity;

wherein the mold comprises a plurality of mold plates aligned in face to face relation and each mold cavity is defined within at least one central plate and two outer plates on either side of the central plate, the central plate including said protrusion.

2. The mold of claim 1, wherein the cross-sectional area of the mold cavity, measured perpendicular to a resin flow path along the cavity, increases monotonically from a top surface of the head portion to the surface on which the common base is formed.

3. The mold of claim 1, wherein the mold cavities are formed by registered openings in adjacent plates.

4. The mold of claim 1, wherein the mold plates are disk-shaped and aligned to form a mold roll with the mold cavities extending inwardly from a peripheral surface of the mold roll.

5. The mold of claim 1, wherein the mold cavities are formed in part by spoon-shaped recesses in the outer plates.

6. The mold of claim 1 arranged adjacent a pressure roll to define a nip therebetween for receiving molten resin.

7. The mold of claim 1, wherein the mold cavities are closed and adapted to enable molded fastener elements to be pulled intact from the cavities without opening the cavities.

8. The mold of claim 1, wherein said protrusion is prismatic.

9. The mold of claim 8, wherein the protrusion includes a parallelepiped portion and a pyramid portion.

10. The mold of claim 1, wherein the mold cavities are sized to mold fastener elements having an overall height, measured from the common base, of between about 0.02 and 0.15 inch.

11. The mold of claim 1, wherein the cavities are adapted to mold fastener elements having longitudinal grooves along their hollow portions, to enhance splitting of the fastener elements to form petals.

12. The mold of claim 11, wherein the protrusions are shaped to form four-sided hollow portions in the fastener elements, to enhance splitting the fastener elements at four corners of their hollow portions to form four petals on each fastener element.

* * * * *